(12) United States Patent
Cirino et al.

(10) Patent No.: US 6,276,880 B1
(45) Date of Patent: Aug. 21, 2001

(54) TOOL INTERCONNECT STRUCTURE

(75) Inventors: John Cirino, Kirtland; Richard Waiwood, Willoughby, both of OH (US)

(73) Assignee: Master Tool Corporation, Grand River, OH (US)

(*) Notice: Subject to any disclaimer, the term of this patent is extended or adjusted under 35 U.S.C. 154(b) by 0 days.

(21) Appl. No.: 09/390,909

(22) Filed: Sep. 7, 1999

Related U.S. Application Data

(60) Provisional application No. 60/099,967, filed on Sep. 11, 1998.

(51) Int. Cl.[7] .................................................... B23C 5/26
(52) U.S. Cl. .......................... 409/234; 82/160; 403/374.1
(58) Field of Search .......................... 82/160; 408/239 R, 408/239 A; 409/232, 234; 403/370, 373, 374.1, 374.2, 374.3, 374.4

(56) References Cited

U.S. PATENT DOCUMENTS

| | | |
|---|---|---|
| 2,253,028 | 8/1941 | Hassig . |
| 3,351,998 | 11/1967 | Theiler . |
| 3,371,397 | 3/1968 | Coleshill et al. . |
| 4,784,542 * | 11/1988 | Tack et al. ........................... 409/234 |
| 4,964,763 | 10/1990 | Kieninger . |
| 5,173,017 | 12/1992 | Oshnock et al. . |
| 5,193,954 | 3/1993 | Hunt . |
| 5,243,884 * | 9/1993 | Haga et al. ............................. 82/160 |
| 5,288,182 | 2/1994 | Patterson et al. . |
| 5,492,441 | 2/1996 | Schuerfeld . |
| 5,683,212 | 11/1997 | Cirino . |
| 5,704,741 | 1/1998 | Cirino . |

FOREIGN PATENT DOCUMENTS

| | | |
|---|---|---|
| 2 204 137 | 8/1973 | (DE) . |
| 2 609 617 | 9/1977 | (DE) . |
| 2 906 840 | 8/1980 | (DE) . |

* cited by examiner

*Primary Examiner*—Steven C. Bishop
(74) *Attorney, Agent, or Firm*—Pearne & Gordon LLP

(57) ABSTRACT

A tool interconnect structure includes a spindle adapter, a rotary cutting tool, and a lock mechanism securing the rotary cutting tool to the spindle adaptor. The spindle adapter has a face and a short hollow tapered shank at the face. The rotary cutting tool has a face for engaging the spindle adaptor face and a tapered recess at the face for cooperating with the tapered shank. The lock mechanism includes a first retention stud secured within the tapered recess, a second retention stud secured within the tapered shank, first and second lock elements located within the hollow tapered shank and on opposite sides of the retention lugs, and a universal screw extending through the lock elements for selectively interconnecting the locking elements with the first and second retention studs. The retention studs and the locking elements have cooperating wedges for generating both a push-on force for obtaining full-face contact between the rotary cutting tool and the spindle adaptor and a pull-off force for separating the tapered recess from the tapered shank.

23 Claims, 5 Drawing Sheets

TOOL INTERCONNECT STRUCTURE

TOOL INTERCONNECT STRUCTURE

This application claims the benefit of provisional application No. 60/099,967 filed Sep. 11, 1998.

BACKGROUND OF THE INVENTION

The present invention generally relates to cutting tools and, more particularly, to the connection of rotary cutting tools to spindles.

Recently, a new interface between a rotary cutting tool and a spindle adaptor was developed seeking solutions to various problems relating to interfaces utilizing a steep angle taper and/or long taper. Particularly improvement was desired with regard to static and dynamic elasticity, tool change precision, and deformation at high speeds. As a result of this development, DIN standard 69893 issued which is directed to the dimensional relationships of a hollow short taper shank of a cutting tool and an associated recess in a spindle adapter. The DIN standard, however, does not address the structure or operation in which the tool shank can be gripped or expanded from its interior to press the shank against the mating recess of the adaptor.

A number of cutting tool manufacturers have developed different clamping or locking mechanisms for this interface between the cutting tool and the spindle adaptor. Each manufacturer secures the lock mechanism to the spindle adaptor within the tapered recess. Typically, the clamping mechanism includes a series of projections or fingers which can be selectively moved radially inward and outward. Once the tapered shank of the cutting tool is properly positioned within the tapered recess of the spindle adaptor, an actuating screw of the clamping assembly provides radial movement of the fingers. Rotation of the screw in one direction moves the fingers radially outward into engagement with the internal surface of the shank hollow interior within an internal groove to form an interference in the longitudinal direction. When tool changeover is required, rotation of the actuator screw in the other direction retracts the fingers radially inward to remove the interference so that the cutting tool shank can be removed. The lock mechanism remains in place in the tapered recess of the spindle adaptor, making the tapered recess into a narrow annular recess. A new cutting tool shank is then inserted into the tapered recess of the spindle adaptor over the lock mechanism and the same process is followed to secure the cutting tool to the spindle adaptor.

While this interface may be an adequate solution for some cutting tool applications, particularly CNC machining centers, the interface may pose additional problems for other cutting tool applications, particularly dedicated spindles. One problem relates to the internal groove which has tolerances which are very difficult to maintain. As a result, the tool is very difficult and expensive to produce. Unfortunately, this internal groove tolerancing is only for the purpose of clamping the cutting tool. There is also some question as to the strength of the narrow wall thickness at the location of the internal groove.

Another problem relates to cleaning. It is of primary importance that the mating, tapered surfaces of the spindle adapter recess and the cutting tool shank be kept clean. Any chips from the cutting operation that become lodged in the recess must be removed. The known lock mechanisms limit accessibility to the tapered recess in the spindle adapter as described above since the lock mechanism is mounted and retained therein. This is particularly a problem in dedicated spindle applications such as transfer line, dial, and trunion line machines which generally require manual tool changing and frequently have limited visual and physical access thereto. With the clamping mechanism located in the female end, it is virtually impossible to clean the spindle adaptor recess. Operators cannot get their fingers inside to wipe the female socket. Chips, dirt, and coolant with small metal filings will most certainly freeze the clamping mechanism, making it impossible to remove the cutting tool. It is not practical to develop inside air blast cleaning for manual installations and external air blasts throw the chips back into the mechanism. Accordingly, there is a need in the art for an improved cutting tool interface.

BRIEF SUMMARY OF THE INVENTION

The present invention provides a cutting tool interface which solves at least some of the above-noted problems. The tool interconnect structure according to the present invention includes a spindle adapter having a tapered shank, a rotary cutting tool having a tapered recess sized and shaped for cooperating with the tapered shank, and a lock mechanism securing the tapered shank within the tapered recess. By putting the tapered recess, the female portion, on the cutting tool it can be more easily cleaned because it is free of the machine.

According to another aspect of the present invention, a tool interconnect structure includes a spindle adaptor and a rotary cutting tool. One of the adaptor and the rotary cutting tool have a tapered shank and the other has a tapered recess cooperating with the tapered shank. A lock mechanism secures the tapered shank in the tapered recess. The lock mechanism includes a first retention stud secured within the tapered recess and at east one lock element within the tapered shank for selectively interconnecting with retention stud. By putting only a retention stud in the tapered recess, the female portion, the recess can be more easily cleaned because it no longer is just a thin annular groove. Additionally, the tapered shank no longer requires an internal groove so that it is easier to produce and has a greater wall thickness.

BRIEF DESCRIPTION OF THE SEVERAL VIEWS OF THE DRAWING

These and further features of the present invention will be apparent with reference to the following description and drawings, wherein.

DETAILED DESCRIPTION OF PREFERRED EMBODIMENTS

Figure 1:
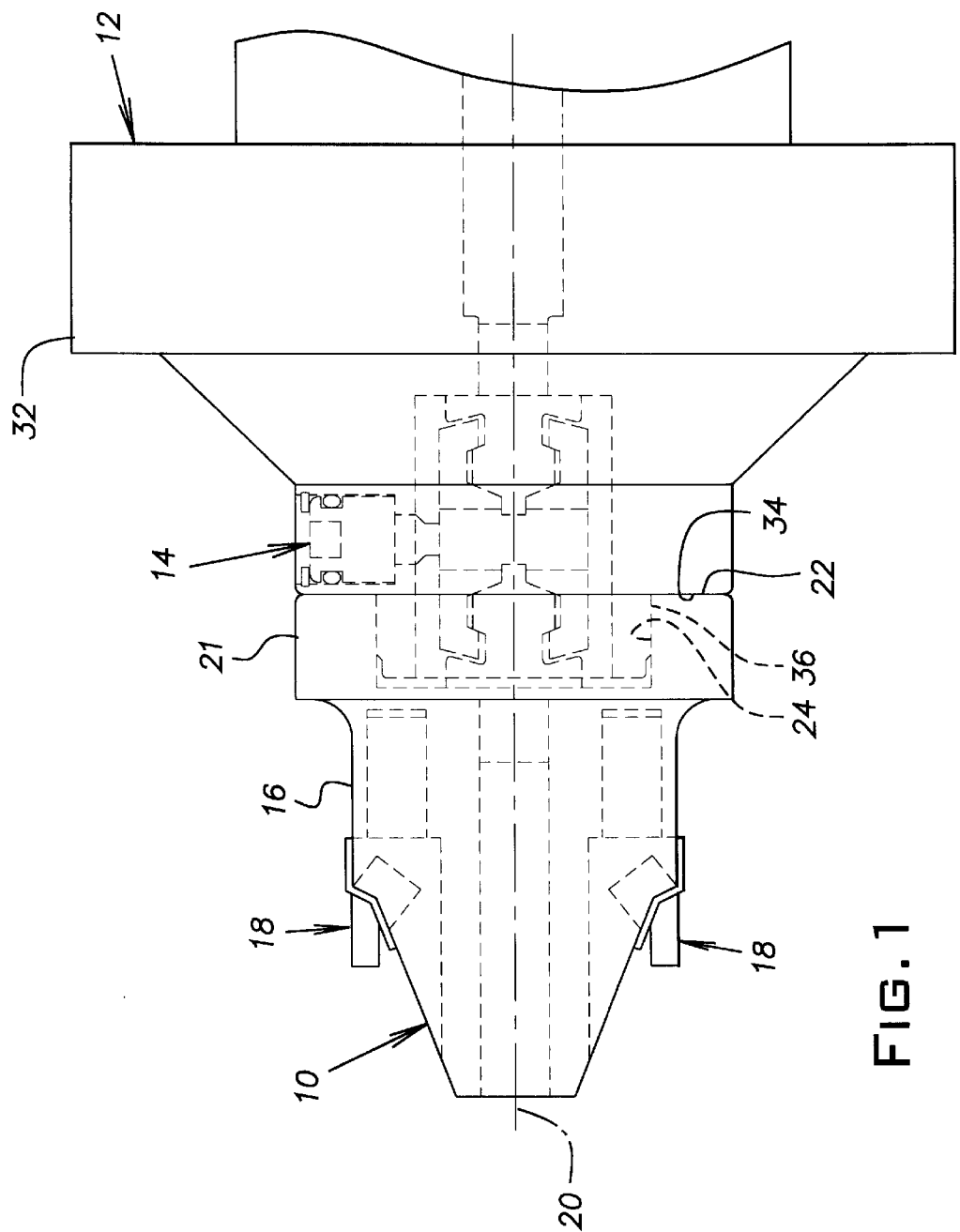
FIG. 1 is an elevational view of a rotational cutting tool connected to a spindle adapter according to the present invention.
Figure 2:
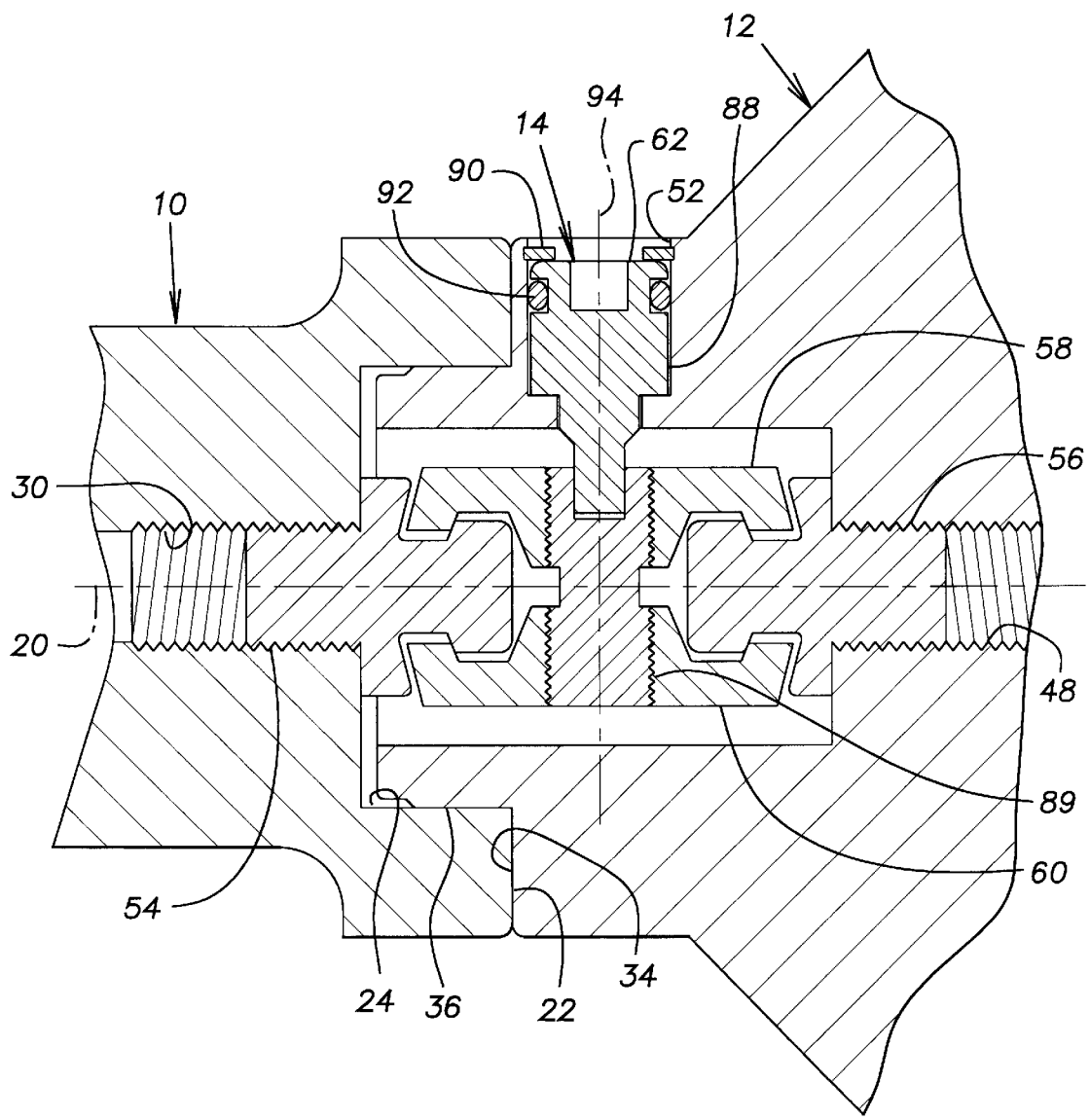
FIG. 2 is an enlarged fragmented view, in cross-section, showing the interconnection of FIG. 1 in a locked condition.
Figure 3:
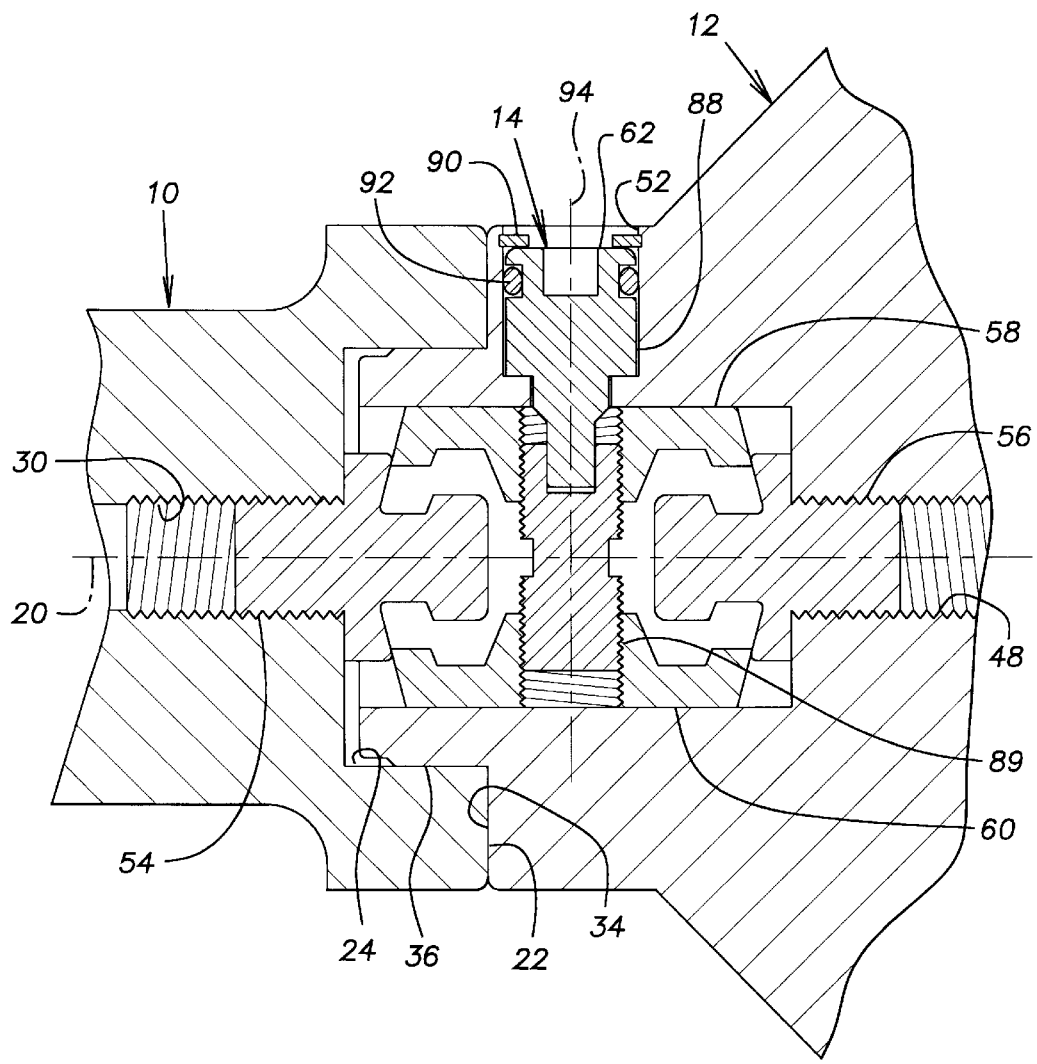
FIG. 3 is an enlarged fragmented view, in cross-section, similar to FIG. 2 but showing the interconnection of FIG. 1 in an unlocked condition.

FIGS. 1–3 illustrate a rotary cutting tool interconnect structure according to the present invention. The interconnect structure includes a rotary cutting tool 10, a spindle adaptor 12 to which the rotary cutting tool 10 is secured, and a clamp or lock mechanism 14 releasably securing the rotary cutting tool 10 to the spindle adaptor 12.

The rotary cutting tool 10 of the illustrated embodiment is valve seat assembly tool but it is noted that other types of rotary cutting tools can be utilized within the scope of the present invention. The rotary cutting tool 10 includes a main body 16 and one or more cartridges or inserts 18 secured to the body to provide precision cutting surfaces mounted at predetermined positions for particular cutting operations. The illustrated cutting surfaces are for forming valve seats in an engine. Preferably, the inserts 18 are removable so that once the cutting surfaces become worn, the inserts 18 can be easily replaced and the new cutting surfaces are disposed at the proper angle and orientation.

The main body 16 is adapted to be longitudinally located on a rotational axis 20 of a spindle for rotation with the spindle as described in more detail hereinafter. The main body 16 is sized and shaped to provide the desired mass and strength for preforming a particular cutting operation. A first or rear end of the rotary cutting tool 10 has a shoulder portion which forms a rear face 22 substantially perpendicular to the rotational axis 20. The rear face 22 limits insertion of the spindle adaptor 12 into the rotary cutting tool 10 as described in more detail hereinafter. A land portion is disposed on the forward side of the shoulder and has a diameter smaller than the shoulder portion. Recesses are provided in the land portion which are adapted to receive the removable inserts 18. A nose portion is disposed on the forward side of the land portion to form a second or forward end which tapers to a minimum diameter. The second end is dimensioned for receipt in an opening of an engine head in which valve seats are to be formed or cut by the rotary cutting tool 10.

Figure 4:
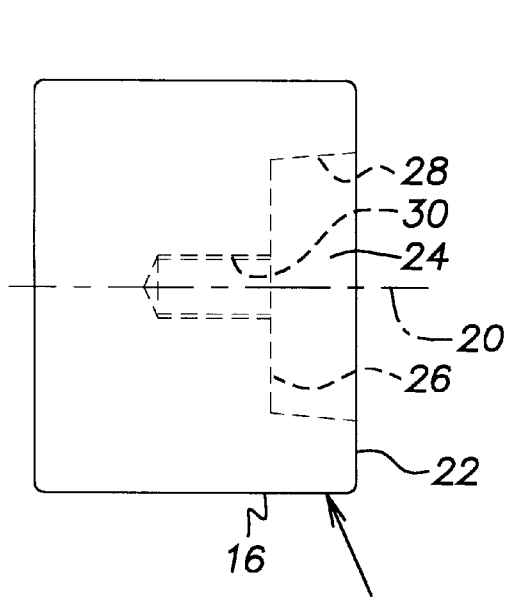
FIG. 4 is a side elevational view of a portion of the cutting tool of FIG. 1.
Figure 5:
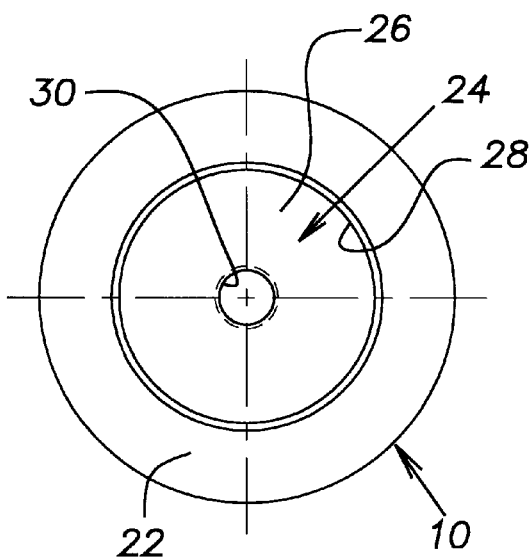
FIG. 5 is an end elevational view of the cutting tool of FIG. 4.

As best shown in FIGS. 4 and 5, a tapered recess 24 is formed in the rear face 22 at the first end of the cutting tool main body 16 and centered on the rotational axis 20. The tapered recess 24 has a planar bottom wall 26 substantially perpendicular to the rotational axis 20 and a tapered side wall 28 which decreases in diameter from a maximum diameter near the rear face 22 to a minimum diameter near the bottom wall 26. The tapered recess 24 is sized and shaped to provide a mating fit with the spindle adaptor 12 as described in more detail hereinbelow. A longitudinally extending bore or opening 30 is centered on the rotational axis 20 and opens into the tapered recess 24 through the bottom wall 26. At least a portion of the bore 30, adjacent the bottom wall 26, is threaded to cooperate with the lock mechanism 14.

As shown in FIG. 1, the spindle adaptor 12 has a body 32 adapted to be longitudinally located on the rotational axis 20 for rotation with the spindle as described in more detail hereinafter. The spindle adaptor 12 can be an integral portion of the spindle or a separate component secured thereto. The boy 32 is sized and shaped to provide the desired mass and strength for cooperating with the rotary cutting tool 10 to preform the particular cutting operation. A first or rear end of the spindle adaptor 12 has a first shoulder portion. An intermediate portion is disposed on the forward side of the shoulder and tapers to a second shoulder portion. The second shoulder portion has a diameter smaller than the first shoulder portion. The second shoulder portion forms a forward face 34 substantially perpendicular to the rotational axis 20. The forward face 34 cooperates with the rear face 22 of the rotary cutting tool 10 to limit insertion ,f the spindle adaptor 12 into the rotary cutting too 10 as described in more detail hereinafter.

Figure 7:
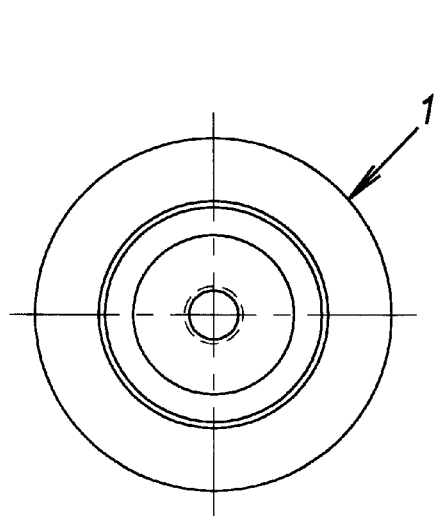
FIG. 7 is an end elevational view of the spindle adapter of FIG. 6.
Figure 6:
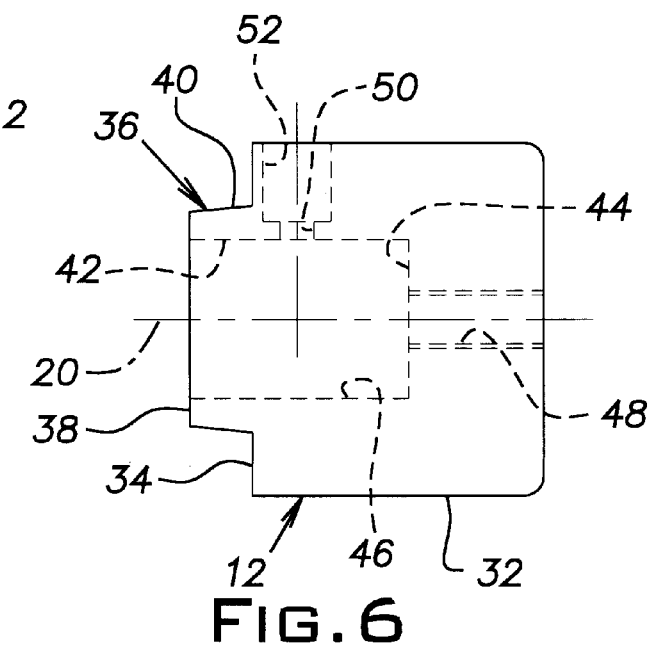
FIG. 6 is a side elevational view of a portion of the spindle adapter of FIG. 1.

As best shown in FIGS. 6 and 7, a tapered shank 36 is formed at the forward face 34 of the spindle adaptor body 32 and centered on the rotational axis 20. The tapered shank 36 has a planar front edge substantially perpendicular to the rotational axis 20 and a tapered side wall 40 which increases in diameter from a maximum diameter near the front edge 38 to a maximum diameter near the forward face 34. The tapered shank 36 is sized and shaped to provide a mating fit with the cutting tool tapered recess 24 as described in more detail hereinbelow.

A longitudinally extending cylindrical recess 42 extends through the tapered shank 36 and is centered on the rotational axis 20. Accordingly, the illustrated tapered shank 36 is a hollow tapered shank. The cylindrical recess 42 has a planar bottom wall 44 substantially perpendicular to the rotational axis 20 and a cylindrical side wall 46. The cylindrical recess 42 is sized to cooperate with the lock mechanism 14 and rearwardly extends into the spindle adaptor body 32. The side wall 46 preferably has a constant diameter through the tapered shank 36 and more preferably throughout its entire length. A longitudinally extending bore or opening 48 is centered on the rotational axis 20 and opens into the cylindrical recess 42 through the bottom wall 44. At least a portion of the bore 48, adjacent the cylindrical recess 42, is threaded to cooperate with the lock mechanism 14. A radially extending bore or opening 50 is substantially perpendicular to the rotational axis 20 in the second shoulder and opens into the cylindrical recess 42 through the side wall 46. The outer end of the radially extending opening 50 is provided with a counterbore 52 in the second shoulder to cooperate with the lock mechanism 14 as described in more detail hereinafter.

The tapered shank 36 is sized to have a shallow angle similar to those required by DIN 69893 (for short tapered, face contact, hollow shank connection). The taper of the shank 36 is preferably about 10/1 and is preferably in the range of about 1½ degrees to about 3 degrees. The tapered shank 36, however, has a length which shorter than those required by DIN 69893. For typical cutting tools, the length of the tapered shank 36 is preferably less than 7/16 inch, and is preferably greater than ¼ inch.

As best shown in FIGS. 1–3, the lock mechanism 14 releasably secures the rotary cutting tool 10 to the spindle adaptor 12. The lock mechanism 14 includes first and second retention studs 54, 56 secured to the rotary cutting tool 10 and the spindle adaptor 12 respectively, first and second lock elements 58, 60 adapted to selectively draw the retention studs 54, 56 toward one another and push the retention studs 54, 56 away from one another, and an actuator screw 62, such as a universal screw, for selectively actuating the lock elements 58, 60. While a preferred lock mechanism 14 is illustrated and described in detail, it is noted that other lock mechanisms can be utilized within the scope of the present invention.

Figures 8, 9:
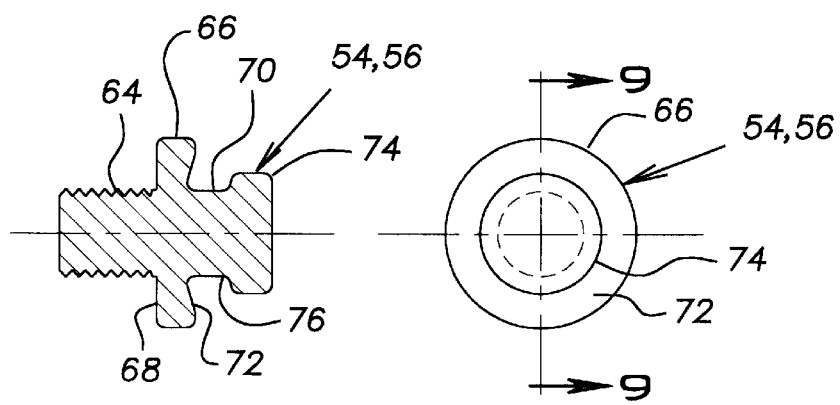
FIG. 8 is an end elevational view of one of the retention studs of FIG. 1.
FIG. 9 is a cross-sectional view taken along line 9—9 of FIG. 8.

As best shown in FIGS. 8 and 9, the first or rear end of each retention stud 54, 56 has an externally threaded shank portion 64 sized to cooperate with the threaded bores 30, 48 of the rotary cutting tool 10 and the spindle adaptor 12. A first shoulder portion 66 is disposed on a forward side of the shank portion 64 and forms a rear face 68 which limits insertion of the retention studs 54, 56 into the bores 30, 48. A land portion 70 is disposed on the forward side of the first shoulder portion 66 and has a diameter smaller than the first shoulder portion 66 to form a first or forward-facing wedge 72. The forward-facing wedge 72 is adapted to cooperate with the lock elements 58, 60 to push the retention studs 54, 56 away from one another as described in more detail hereinafter. The forward-facing wedge 72 is preferably rearwardly inclined toward the axis 20. A second shoulder portion 74 is disposed on the forward side of the land portion 70 and has a diameter larger than the land portion 70 but smaller than the first shoulder portion 66 to form a second or rearward-facing wedge 76. The rearward-facing wedge 76 is adapted to cooperate with the lock elements 58, 60 to draw the retention studs 54, 56 toward one another as described in more detail hereinafter. The rearward-facing wedge 76 is preferably rearwardly inclined toward the axis 20.

Figures 10, 11:
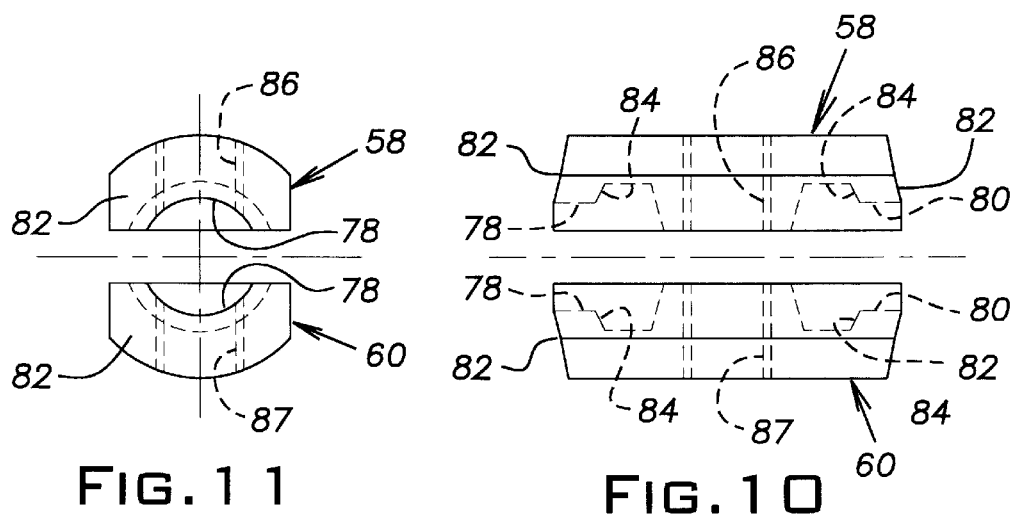
FIG. 10 is a side elevational view of a pair lock elements of FIG. 1.
FIG. 11 is an end elevational view of the lock elements of FIG. 10.

As best shown in FIGS. 10 and 11, the ends of each lock element 58, 60 form first or outward-facing wedges 82. The outward-facing wedges 82 are adapted to cooperate with the first wedges 72 of the retention studs 54, 56 to push the retention studs away 54, 56 from one another as described in more detail hereinafter. The outward-facing wedges 82 are preferably outwardly inclined toward the axis 20. Each lock element 58, 60 has a front groove 78 and a rear groove 80 on an inner side thereof to face the rotational axis 20. The front grooves 78 are adapted to cooperate and partially encircle one retention stud 54 and the rear grooves 80 are adapted to cooperate and partially encircle the other retention stud 56. The grooves 78, 80 are generally arcuate in cross-section and are sized and shaped to receive the second shoulder portion 74 of the retention studs 54, 56. The grooves 78, 80 each form a second or inward facing wedge 84. The inward-facing wedge 84 is adapted to cooperate with the second wedges 76 of the retention studs 54, 56 to draw the retention studs 54, 56 toward one another as described in more detail hereinafter. The inward-facing wedges 84 are preferably outwardly inclined toward the axis.

Threaded openings or bores 86, 87 centrally extend through each lock element 58, 60 and are substantially perpendicular to the rotational axis 20. The bores 86, 87, however, are threaded in opposite directions in the two lock elements 58, 60. In the illustrated embodiment, the first or upper lock element 58 has a right-hand thread and the second or lower lock element 60 has a left-hand thread.

As best shown in FIGS. 2 and 3, the retention studs 54, 56 are located in the respective bores 30, 48 and face one another when the tapered shank 36 is initially inserted into the tapered recess 24 (FIG. 3). The lock elements 58, 60 are held on opposite sides of the retention studs 54, 56 by the universal screw 62.

The universal screw 62 includes a main body 88 and a threaded shank 89 secured to the main body 88 for rotation therewith. The main body 88 has a first portion sized and shaped to be located within the counterbore 52 and a second portion of smaller diameter sized extend through the opening 50 into the cylindrical recess 42. A lock ring 90 or other suitable retaining device is provided to retain the universal screw 62 in the counterbore 52. Preferably, an o-ring 92 or other suitable seal member is provided to seal the opening in the spindle adaptor 12 for the universal screw 62.

The threaded shank 89 is connected to the main body 88 second portion within the cylindrical recess 42 of the spindle adaptor 12 and radially extends centrally between the retention studs 54, 56. The threaded shank 89 has first and second threaded regions having threads in opposite directions to cooperate with the bores 86, 87 of the lock elements 58, 60. In the illustrated embodiment, the first or upper threaded region has a right-hand thread and the second or lower region has a left-hand thread.

With the lock elements 58, 60 located on the respective threaded regions of the threaded shank 89, the lock elements 58, 60 are initially in an unlocked position (FIG. 3). In the unlocked position, the lock elements 58, 60 are spaced apart an adequate distance so that the retention stud 54 of the rotary cutting tool 10 can pass therebetween when the tapered recess 24 is placed over the tapered shank 36 to connect the rotary cutting tool 10 to the spindle adaptor 12. As shown in FIG. 3, the tapered connection is tightly dimensioned such that the faces 22, 34 typically do not initially meet.

Preferably, at least one orientation pin and associated opening are preferably provided in the faces 22, 34 so that the cutting tool 10 and the spindle adapter 12 can be connected in only one orientation. It is also desirable to include additional pins for error proofing so that only the correct type of cutting tool 10 can be connected to the spindle adaptor 12.

Once the tapered recess 24 is placed over the tapered shank 36, the lock mechanism 14 is actuated to secure the rotary cutting tool 10 to the spindle adaptor 12. The lock mechanism 14 is actuated by rotating the universal screw 62 about its central axis 94. The rotation of the universal screw 62 inwardly drives the lock elements 58, 60 toward the retention studs 54, 56 and the rotational axis 20 where the lock elements 58, 60 cooperate to partially encircle the retention studs 54, 56. It should be apparent that the second wedges 84 of the lock elements 58, 60 engage the second wedges 76 of the retention studs 54, 56 upon the inward motion of the lock elements 58, 60 to pull the retention studs 54, 56 toward one another. By pulling the retention studs 54, 56 toward one another, the rotary cutting tool 10 and the spindle adaptor 12 are pulled toward one another until the faces 22, 34 engage as shown in FIG. 2. There is preferably full-face contact and preferably at least 80% taper contact. In this locked position, there is a longitudinal interference between the locking elements 58, 60 and the retention studs 54, 56 which prevents the rotary cutting tool 10 from being removed from the spindle adaptor 12.

The lock mechanism 14 is also actuated to selectively remove the rotary cutting tool 10 from the spindle adaptor 12. The lock mechanism 14 is actuated by rotating the universal screw 62 about its central axis 94 in the opposite direction. The rotation of the universal screw 62 outwardly drives the lock elements 58, 60 away from retention studs 54, 56 and the rotational axis 20. It should be apparent that the first wedges 82 of the lock elements 58, 60 engage the first wedges 72 of the retention studs 54, 56 upon the outward motion of the lock elements 58, 60 to push the retention studs 54, 56 away from one another. By pushing the retention studs 54, 56 away from one another, the rotary cutting tool 10 and the spindle adaptor 12 are pushed away from one another until the faces 22, 34 are separated and the interference fit of the tapered connection is broken as shown in FIG. 3. In this unlocked position, there is no longer a longitudinal interference between the locking elements 58, 60 and the retention studs 54, 56 and the rotary cutting tool 10 can be removed from the spindle adaptor 12.

From the above description it can be appreciated that the retention studs 54, 56 and the lock elements 58, 60 have cooperating wedges for generating both a push-on force for obtaining full-face contact between the rotary cutting tool 10 and the spindle adaptor 12 and a pull-off force for separating the tapered recess 24 from the tapered shank 36.

Although particular embodiments of the invention have been described in detail, it will be understood that the invention is not limited correspondingly in scope, but includes all changes and modifications coming within the spirit and terms of the claims appended hereto.

What is claimed is:

1. A tool interconnect structure comprising a spindle adapter having a tapered shank, said tapered shank having a length of less than 7/16 inch, a rotary cutting tool having a tapered recess sized and shaped for cooperating with said tapered shank, and a lock mechanism securing said tapered shank within said tapered recess.

2. The tool interconnect structure according to claim 1, wherein said tapered shank is a hollow tapered shank.

3. The tool interconnect structure according to claim 1, wherein said tapered shank has a taper of about 10/1.

4. The tool interconnect structure according to claim 1, wherein said tapered shank has a taper of about 1½ to about 3 degrees.

5. The tool interconnect structure according to claim 1, wherein said tapered shank has a length of greater than ¼ inch.

6. The tool interconnect structure according to claim 5, wherein said tapered shank is a hollow tapered shank.

7. The tool interconnect structure according to claim 1, wherein said tapered shank is a hollow tapered shank.

8. The tool interconnect structure according to claim 1, wherein said spindle adapter has a longitudinal axis and a face substantially perpendicular to said longitudinal axis.

9. The tool interconnect structure according to claim 8, wherein said cutting tool has a longitudinal axis and a face perpendicular to said longitudinal axis, and said face of said cutting tool is adapted to engage said face of said spindle adapter when said lock mechanism secures said tapered shank within said tapered recess.

10. A rotary cutting tool comprising a body adapted for rotation about a longitudinal axis, said body forming a face substantially perpendicular to said longitudinal axis and a tapered recess at said face and substantially coaxial with said longitudinal axis, said tapered recess having a longitudinally extending retention stud secured thereto.

11. The rotary cutting tool according to claim 10, wherein said tapered recess is adapted to receive a tapered shank having a taper of about ½ to about 3 degrees.

12. The rotary cutting tool according to claim 10, wherein said tapered recess is adapted to receive a tapered shank having a length less than 7/16 inch.

13. A tool interconnect structure comprising a spindle adaptor, a rotary cutting tool, one of said adaptor and said rotary cutting tool having a tapered shank and the other having a tapered recess cooperating with said tapered shank, and a lock mechanism securing said tapered shank in said tapered recess, said lock mechanism including a first retention stud secured within said tapered recess and at least one lock element within said tapered shank and selectively interconnecting with retention stud.

14. The tool interconnect structure according to claim 13, wherein said tapered shank is a hollow tapered shank.

15. The tool interconnect structure according claim 14, wherein said lock mechanism includes a second retention stud secured within said hollow tapered shank and said lock element selectively interconnects with both said first and second retention studs.

16. The tool interconnect structure according to claim 15, wherein said lock mechanism includes a second lock element at an opposite side of said first and second retention studs from said first lock element and both said first and second lock elements selectively interconnect with each of said first and second retention studs.

17. The tool interconnect structure according to claim 13, wherein said lock mechanism includes a second lock element at an opposite side of said retention stud from said first lock element and both said first and second lock elements selectively interconnect with said retention stud.

18. The tool interconnect structure according to claim 13, wherein said lock element has a first wedge adapted to pull said shank into said recess when said locking element is moving toward said retention stud.

19. The tool interconnect structure according to claim 18, wherein said lock element has a second wedge adapted to push said shank out of said recess when said locking element is moving away from said retention stud.

20. The tool interconnect structure according to claim 13, wherein said lock element has a wedge adapted to push said shank out of said recess when said locking element is moving away from said retention stud.

21. The tool interconnect structure according to claim 13, wherein said lock mechanism further includes an actuator cooperating with said lock element to selectively interconnect said lock element with said retention stud.

22. The tool interconnect structure according to claim 21, wherein said actuator includes a screw engaging said lock element and perpendicular to a longitudinal axis of said tapered shaft and said tapered recess.

23. A tool interconnect structure comprising a spindle adapter having a hollow tapered shank, a rotary cutting tool having a tapered recess sized and shaped for cooperating with said tapered shank, and a lock mechanism securing said tapered shank within said tapered recess, said lock mechanism including a first retention stud secured within said tapered recess, a second retention stud secured within said tapered shank, first and second lock elements within said hollow tapered shank and on opposite sides of said retention lugs, and an actuator for selectively interconnecting said locking elements with said first and second retention studs.

* * * * *